United States Patent

Buchan

[15] 3,704,933
[45] Dec. 5, 1972

[54] SEE-THROUGH READOUT OF ELECTRO-OPTIC MEDIUM

[72] Inventor: William R. Buchan, Lincoln, Mass.
[73] Assignee: Itek Corporation, Lexington, Mass.
[22] Filed: May 4, 1971
[21] Appl. No.: 140,088

[52] U.S. Cl................................350/150, 350/152
[51] Int. Cl..............................................G02f 1/26
[58] Field of Search.......350/147, 150, 152, 157, 160

[56] References Cited

UNITED STATES PATENTS

| | | | |
|---|---|---|---|
| 3,449,583 | 6/1969 | Eden | 350/150 |
| 3,445,826 | 5/1969 | Myers | 350/150 |
| 3,566,130 | 2/1971 | Aldrich et al. | 350/150 |
| 3,517,206 | 6/1970 | Oliver | 350/150 |
| 3,527,879 | 9/1970 | Pritchard | 350/150 |
| 3,499,157 | 3/1970 | Satake et al. | 350/150 |
| 3,396,305 | 8/1968 | Buddecke et al. | 350/150 |

*Primary Examiner*—David Schonberg
*Assistant Examiner*—Paul R. Miller
*Attorney*—Homer O. Blair, Robert L. Nathans, David E. Brook and Joseph S. Iandiorio

[57] ABSTRACT

An apparatus and a method for reading out information present in the form of variations in electric field intensity including applying an electric field whose intensity varies in a predetermined pattern to a birefringent electro-optic medium whose birefringence varies as a function of the intensity of an applied electric field; providing to the medium polarized radiation whose polarization is modulated by the birefringence of the medium in accordance with the intensity of an applied electric field; and submitting that radiation to a transparent element at Brewster's angle to detect the modulation of the radiation representative of that predetermined pattern.

12 Claims, 3 Drawing Figures

WILLIAM R. BUCHAN
INVENTOR.

BY Joseph S. Iandiorio
ATTORNEY.

SEE-THROUGH READOUT OF ELECTRO-OPTIC MEDIUM

CHARACTERIZATION OF INVENTION

The invention is characterized in reading out information present in the form of variations in electric field intensity including applying an electric field whose intensity varies in a predetermined pattern to a birefringent electro-optic medium whose birefringence varies as a function of the intensity of the applied electric field; providing to the medium the polarized radiation whose polarization is modulated by the birefringence of the medium in accordance with the intensity of an applied electric field; and submitting that radiation to a transparent element at Brewster's angle to detect the modulation of the radiation representative of that predetermined pattern.

FIELD OF INVENTION

This invention relates to the use of the transparent element inclined to receive polarized radiation at Brewster's angle to detect the modulation of that polarized radiation representative of a predetermined pattern of information which is imposed on the polarized radiation by the birefringence of an electro-optic birefringent device subjected to an electric field whose intensity varies in that predetermined pattern, and more particularly to the use of such an element in a see-through display system wherein a first scene transmitted from the electro-optic device appears superimposed on a second scene observable through the element.

BACKGROUND OF INVENTION

Recent developments in the field of electro-optic information processing have introduced techniques for representing information by variations in electric field intensity, and reading out such information by detecting the modulation imposed on radiation by an electro-optic medium having an optical characteristic that varies as a function of an associated electrical field. For example, an optical image may be applied to a photoconductor medium combined with an electro-optic birefringent medium between a pair of electrodes which provide an electric field across the medium. The pattern of variation in the optical intensity of the image causes a similar pattern of variation in the conductance of the photoconductor medium which in turn produces a similar pattern of variation of the electric field intensity at the electro-optic birefringent medium, so that the birefringence of that medium too has that pattern of variation. Polarized radiation shone through the electro-optic medium has its polarization modulated in the same pattern and that modulation may be detected by an analyzer to reproduce the original optical image, more brightly, in another wavelength or with various other modifications.

Various analyzers and analyzing techniques have been used to detect the modulation and reconstruct the original information pattern but presently there is no such analyzer which permits see-through display and efficiently performs the analyzing function. Such see-through displays are desirable when a first scene is to be viewed simultaneously with and superimposed on a second scene. This is often the case in many types of land, sea and air craft, for example, where the pilot must view the terrain ahead and yet is required to constantly scan navigation and control instruments within his cabin or cockpit. Currently, this might only be accomplished with conventional projectors using relatively high illumination levels which may disrupt the pilot's vision and obscure the other scene.

SUMMARY OF INVENTION

Thus it is desirable to have available a new method and apparatus for analyzing modulation of polarized radiation to detect an information pattern represented thereby.

It is also desirable to have such a method and apparatus capable of providing efficient see-through of a second scene superimposed on a first scene including the information pattern detected.

It is also desirable to have such a method and apparatus which is small, compact, can operate with low level radiation pattern inputs to produce higher level radiation pattern outputs in various wavelengths, and can utilize a transparent element such as a windshield to perform the analyzing function and permit see-through display.

The invention may be accomplished by reading out information present in the form of variations in electric field intensity. An electric field whose intensity varies in a predetermined pattern is applied to a birefringent electro-optic medium whose birefringence varies as a function of the intensity of an applied electric field. Polarized radiation is provided to the medium and the polarization of that radiation is modulated by the birefringence of the medium in accordance with the intensity of the applied electric field. That modulated radiation is submitted to a transparent element at Brewster's angle to detect the modulation representative of the predetermined pattern.

DISCLOSURE OF PREFERRED EMBODIMENT

Other objects, features and advantages will occur from the following description of a preferred embodiment and the accompanying drawings in which:

FIG. 1 is an axonometric diagrammatic view of a system in which a pattern of information in the form of an optical image is used to establish a similar pattern in the intensity of an electric field associated with an electro-optic birefringent device which is read out by detecting the modulation imposed on polarized radiation by the birefringence of the electro-optic device under the influence of the electric field.

Figure 1:
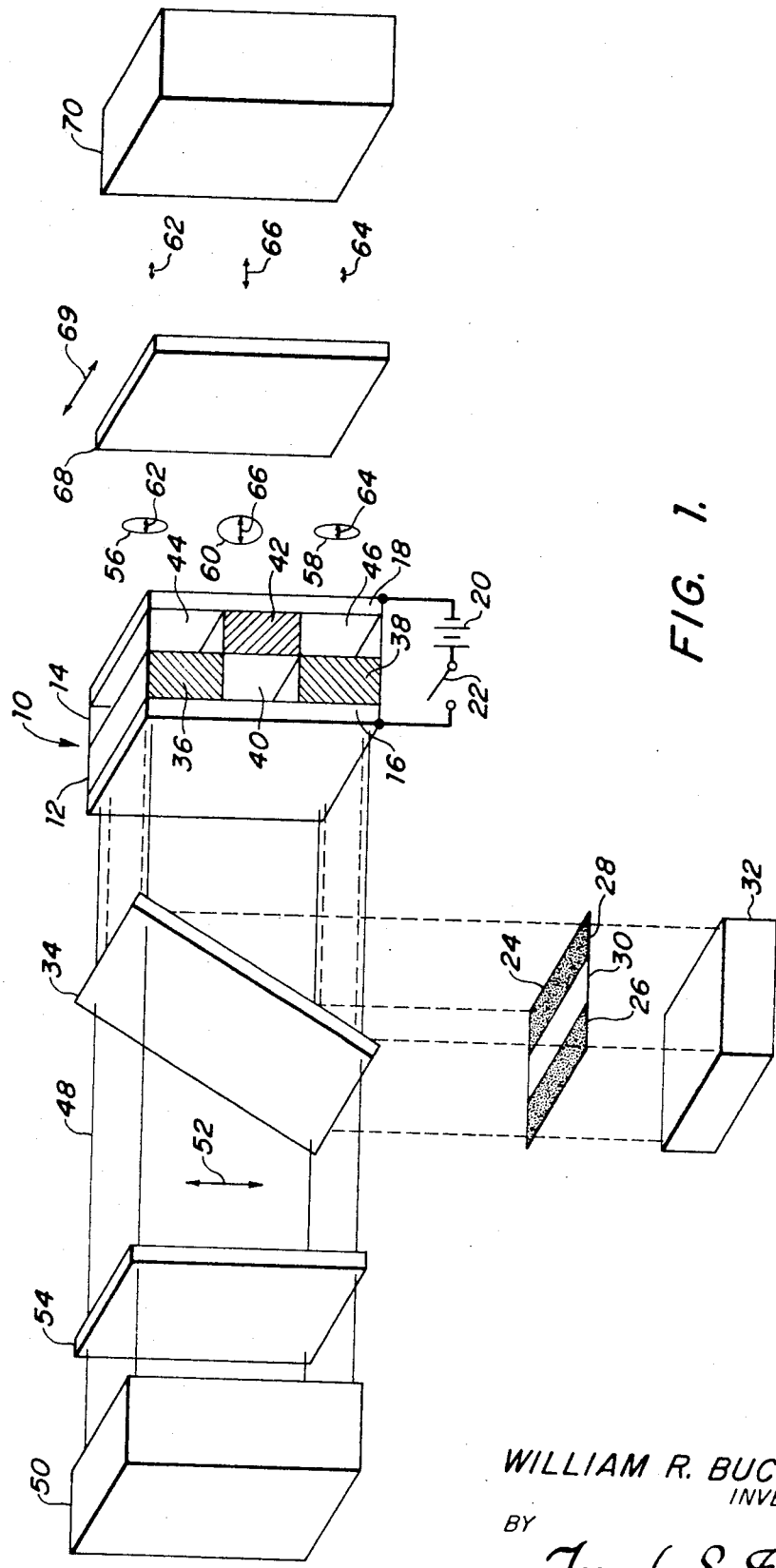

There is shown in FIG. 1 a typical system using an electro-optic device for reading out information present in the form of variations in the intensity of an electric field including an electro-optic device 10 having a photoconductive medium, layer 12, and an electro-optic medium in a separate layer 14 between electrodes 16 and 18 energized by battery 20 through switch 22. A pattern of information in the form of an optical image borne by transparency 24 in the form of two dark or high intensity portions 26 and 28 and one transparent or low density portion 30 is illuminated by radiation from source 32 directed to photoconductive layer 12 by means of a beam splitter such as half-silvered mirror 34. The lower intensity radiation from portions 26 and 28 of transparency 24 reduces the conductance of sections 36 and 38 of layer 12 only slightly. The higher intensity radiation from portion 30 of transparency 24 reduces the conductance of section 40 of layer 12 to a greater extent. Thus the electric field is more intense at section 42 of electro-optic layer 14 than it is at sections 44 and 46 of that layer.

Radiation 48 from source 50 is linearly polarized 52 by polarizer 54 and is directed through mirror 34 to device 10. As radiation 48 is transmitted by device 10 the polarization of the radiation that passes through sections 44 and 46 of layer 14 is modulated only slightly as indicated by ellipses 56 and 58 which are narrow in the horizontal dimension. However, in radiation passing through section 42 the circular polarization is modulated more substantially as indicated by ellipse 60 which is more elongated in the horizontal dimension. As a result the horizontal components 62, 64 of the radiation represented by ellipses 56, 58 are substantially smaller than horizontal component 66 of the radiation represented by ellipse 60. And these components 62, 64 and 66 can be detected by a crossed polarizer or analyzer 68, whose polarization axis is parallel to the elongated horizontal axes of ellipses 56, 58, 60 as identified by arrow 69 to produce a pattern representative of the information pattern borne by transparency 24. The output from analyzer 68 can then be detected by some suitable sensor 70.

Light source 32 may provide any type of radiation to which the photoconductor medium of layer 12 is responsive. Similarly light source 50 may provide any type of radiation which does not affect the photoconductive medium of layer 12 but will pass through that layer to be modulated by the electro-optic birefringent medium of layer 14. For example, source 32 may supply red light or blue light and source 50 may supply green light or orange light so that the input information is provided in one color and the image produced by the readout appears in another color. Additionally, the input may be in one of ultraviolet, visible, infra-red radiation bands and the light from source 50 may be in another one of those bands. The radiation from source 50 may be circularly polarized instead of plane polarized if a quarter wave plate is inserted between device 10 and analyzer 68. If source 50 itself can supply the polarized radiation then an additional polarizing element is unnecessary. The photoconductor medium may be a doped zinc sulfide, doped zinc selenide or cadmium sulfide and the electro-optic birefringent medium may be cubic zinc sulfide, or cubic zinc selenide. The dark resistance of the photoconductor medium is preferably substantially higher than the resistance of the electro-optic medium and the light resistance of the photoconductor should be substantially lower than the resistance of the electro-optic medium. In addition, if the device 10 is to be used to store the charge a significant period of time, the equivalent capacitance and resistance of the two layers should be high to prolong dissipation of the charge distribution established across the electro-optic medium as a result of the change in conductance of the photoconductor medium. If the storage feature is not important or it is desired to have a quick dissipation of the information present in the form of the variations of the electric field intensity then the capacitance and resistance of the two layers would be made substantially smaller so that charge leakage would occur at a faster rate. Alternatively, the electro-optic and photo-conductor mediums may be combined in a single layer which could be cubic zinc sulfide, or cubic zinc selenide and that layer would be sandwiched with a dielectric layer of polystyrene, PARALENE, a product of Union Carbide Corporation, methacrylate or silicon dioxide between the pair of electrodes.

The image may be submitted to the optical device 10 as a whole or serially in a scanning mode and the readout polarized light from source 50 may similarly be provided all at once or serially.

Figure 2:
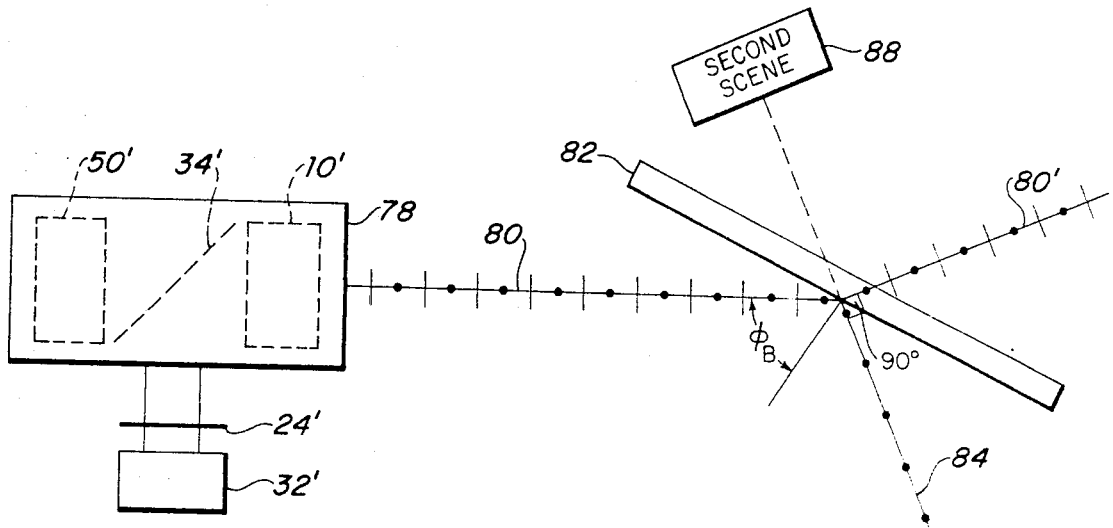
FIG. 2 is a diagram of a system using an electro-optic device similar to that of FIG. 1 and employing a transparent element inclined at Brewster's angle for detecting the modulation of the polarized radiation and for permitting see-through display in accordance with this invention.

A see-through electro-optic system according to this invention is shown in FIG. 2 where like parts have been given like numbers primed with reference to FIG. 1. A first scene borne by transparency 24' irradiated by source 32' is directed to electro-optic unit 78 which includes mirror 34', device 10', and source 50'. That scene establishes a pattern of electric field intensity in device 10' that modulates the polarization of the polarized radiation from source 50'. The modulated polarized radiation 80 emitted from device 10' is directed to a transparent element 82 inclined to receive the radiation 80 incident at Brewster's angle $\phi$. As a result of a phenomenon identified as Brewster's Law one component 84 only of polarization of radiation 80 is reflected to sensor 70' and in this manner detection of the modulation representative of the pattern of information borne by transparency 24' is accomplished in the same manner as if an analyzer 68, FIG. 1, had been used. The remaining portion 80' of radiation 80 is refracted through element 82. Since element 82 is transparent and may be, for example, a glass plate, a second scene 88 behind element 82 may be viewed by sensor 70' simultaneously and superimposed on the image or pattern detected by element 82 as represented by the component of polarization 84. Sensor 70' may be a prism as well as an electrical or optical device.

Brewster's Law states that at the particular angle at which an incident ray on the surface of a dielectric such as glass produces a refracted ray and a reflected ray which are ninety degrees apart the reflected ray will be plane polarized. That angle is known as Brewster's angle $\phi_B$ and is the angle whose tangent is equal to the index of refraction $n$ of the dielectric material and is expressed as $\phi_B = \arctan n$. A more lengthy description of this phenomenon is contained in *Fundamentals of Optics*, Jenkins and White, McGraw-Hill Book Company, Inc., Third Edition 1957, pp. 491 and 492. In FIG. 2 where element 82 is ordinary glass Brewster's angle $\phi_B$ is equal to approximately fifty-seven degrees.

Figure 3:
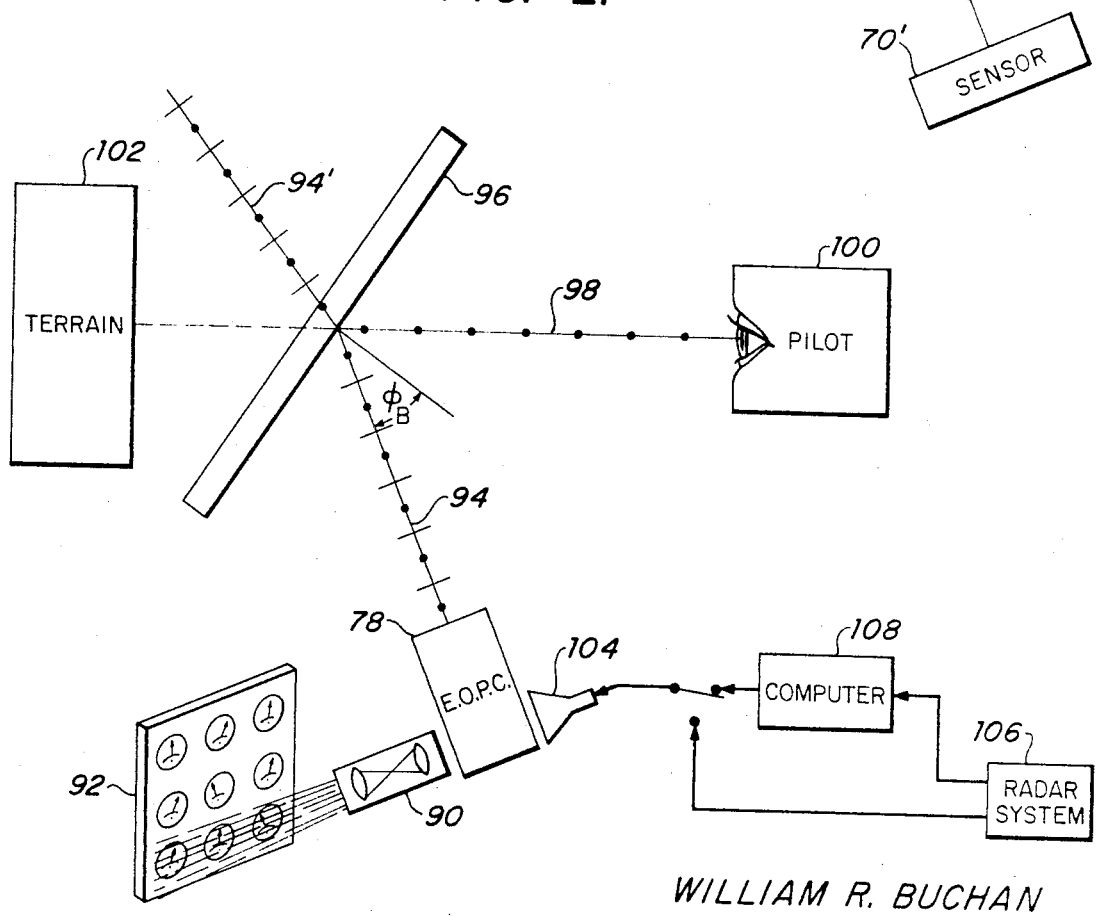
FIG. 3 is a diagram of a see-through display system similar to that in FIG. 2 disposed in the cockpit of an aircraft and using the windshield of the aircraft as the transparent element for receiving radiation at Brewster's angle.

In one application, FIG. 3, unit 78 may receive a first scene from an optical apparatus 90 which scans an instrument panel 92 in the cockpit of an aircraft. That scene contained in the modulated polarized radiation 94 is directed by unit 78 at Brewster's angle $\phi_B$ to a transparent element, the windshield 96 of the aircraft. A portion 94' of radiation 94 is refracted through windshield 96. Another portion 98 is reflected and simultaneously has one polarization component detected by windshield 96 so that first scene is observable by the pilot 100. Pilot 100 looks directly through windshield 96 and can simultaneously observe superimposed on that first scene a second scene 102 such as the terrain ahead and below the path of the plane. The first scene from apparatus 90 may appear greatly magnified or in a bright color so that it is easily distinguishable from the second scene 102. The same unit 78 or an additional unit may also be used to receive a scene such as appears on a radar scope or cathode ray tube 104 driven by a radar system 106 or may receive a scene on cathode ray tube 104 which is generated by a computer 108 which in turn derives information to construct a scene from map inputs or other such information or even from a radar system 106. Since the brightness of the radiation 94 is determined solely by control of the source 50' the image reflected from windshield 96 to pilot 100 may be set at optimum brightness while the instrument panel 92 viewed by apparatus 90 may be dimly lit, so as not to interfere with the vision of the pilot.

Other embodiments will occur to those skilled in the art and are within the following claims:

What is claimed is:

1. A see-through display system for permitting the simultaneous observation of superimposed scenes comprising:
    an electro-optic device including an electro-optic birefringent medium whose birefringence varies as a function of the intensity of an applied electrical field.
    means for applying to said electro-optic medium an electric field whose intensity varies in a predetermined pattern representative of a first scene and means for providing to said medium, polarized radiation whose polarization is modulated by the birefringence of said medium in accordance with the intensity pattern of the electric field representative of said first scene;
    means for presenting said first scene to said means for applying; and
    a transparent element for receiving the modulated polarized radiation from said electro-optic device at Brewster's angle for detecting the modulation of that radiation representative of said first scene.

2. The system of claim 1 in which said means for presenting includes an optical imaging system for projecting to said means for applying the image of a selected said first scene.

3. The system of claim 1 in which said means for presenting includes a cathode ray tube for displaying the said first scene to said means for applying.

4. The system of claim 1 in which said means for applying includes a semiconductor medium whose conductance varies as a function of the intensity of incident radiation.

5. The system of claim 4 in which said semiconductor medium and said electro-optic medium are each embodied in a separate element.

6. The system of claim 4 in which said means for applying further includes a pair of electrodes between which the mediums are disposed.

7. The system of claim 6 in which said means for applying further includes means for energizing said electrodes.

8. The system of claim 1 in which said means for providing includes a polarizing element.

9. The system of claim 1 in which said means for providing includes a radiation source.

10. The system of claim 4 in which said means for applying includes means for directing a radiant image to said semiconductor medium.

11. The system of claim 10 in which said means for directing includes beam joining means for combining said polarized radiation with the radiation forming said radiant image.

12. A method of reading out information present in the form of variations in electric field intensity comprising:
    applying an electric field whose intensity varies in a predetermined pattern to a birefringent electro-optic medium whose birefringence varies as a function of the intensity of an applied electric field;
    providing to said medium polarized radiation whose polarization is modulated by the birefringence of said medium in accordance with the intensity of an applied electric field; and,
    submitting that radiation to a transparent element at Brewster's angle to detect the modulation of said radiation representative of that predetermined pattern.

* * * * *